United States Patent [19]

Keur

[11] 4,319,251

[45] Mar. 9, 1982

[54] INK JET PRINTING EMPLOYING REVERSE CHARGE COUPLING

[75] Inventor: Robert I. Keur, Niles, Ill.

[73] Assignee: A. B. Dick Company, Chicago, Ill.

[21] Appl. No.: 178,530

[22] Filed: Aug. 15, 1980

[51] Int. Cl.[3] .............................................. G01D 15/18
[52] U.S. Cl. .......................................... 346/1.1; 346/75
[58] Field of Search ........................ 346/75, 140 R, 1.1

[56] References Cited

U.S. PATENT DOCUMENTS 3,060,429 10/1962 Winston .................................. 346/1
3,579,245 5/1971 Berry ................................ 346/75 X
3,596,275 7/1971 Sweet ...................................... 346/1
3,827,057 7/1974 Bischoff et al. ........................ 346/75
3,916,421 10/1975 Hertz ...................................... 346/75
3,972,474 8/1976 Keur .................................... 239/102

OTHER PUBLICATIONS

*Scientific American,* Apr., 1979, "Ink Jet Printing", Kuhn and Myers, pp. 162–178.
A. B. Dick Company Model 9600 Product Manual, pp. 3-1 to 3-5.

*Primary Examiner*—L. T. Hix
*Assistant Examiner*—W. J. Brady
*Attorney, Agent, or Firm*—McDougall, Hersh & Scott

[57] ABSTRACT

A method and apparatus for ink jet printing are disclosed which employ reverse charge coupling to increase character height. A video signal is utilized to modulate the charge ring voltage. Via a parallel path the ink in the nozzle is reversely charged by the video signal. Thus, as the ink drops are formed their electrical charge is greater than can be obtained under ordinary circumstances. This permits greater deflection of the drops resulting in larger characters on the printing media at the normal distance between media and nozzle or higher quality characters of the same size if the media is moved closer to the nozzle.

12 Claims, 3 Drawing Figures

INK JET PRINTING EMPLOYING REVERSE CHARGE COUPLING

BACKGROUND OF THE INVENTION

This invention relates to the field of high speed printing of characters on printing media, such as paper sheets, labels or the like. More specifically, it relates to nonimpact type printing utilizing tiny droplets of ink forced through a nozzle under pressure and commonly referred to as ink jet printing. Ink jet printing utilizes electrically conductive ink which is forced through a nozzle surrounded by a charge ring. The ink drop stream is produced by a pressurized orifice assembly subjected to ultrasonic vibrations. Under the influence of pressure and vibration the ink stream breaks up at a regular drop rate as it leaves the orifice. The drop rate is directly proportional to the vibration rate usually produced by a piezoelectric crystal oscillator.

Upon leaving the orifice the ink drop stream is directed past a charge electrode or ring where the drops become charged in proportion and opposite polarity to the voltage on the ring. By synchronizing the charge on the ring with the drop formation rate the charge on each drop is discretely controlled.

The charged drops are then directed past a set of relatively large deflection plates which may carry a difference of potential of several thousand volts. The ink drops are deflected from their initial path in proportion to their charge. Uncharged drops are not deflected and pass into a gutter in line with their trajectory which recirculates the ink back to the nozzle. The result is the ability to print vertical lines or any portion of a line on a printing medium by controlling the electrical charge which a drop receives. By moving the medium relative to the nozzle characters may be formed.

In order to avoid misplacement of drops caused by aerodynamic and electrostatic disturbances, it is necessary to observe certain limitations. Thus, for example, the distance between the nozzle and the print medium must be kept small for uncorrectable distortions occur when the medium is beyond the "merge zone". The merge point is defined as a point in space that represents the merger of consecutive deflected drops travelling along the same flight path in space. The locus of all merge points represents a line in space that defines the merge zone. If printing occurs before entering the merge zone printing distortions can be drastically reduced. Thus, the desire to keep the distance between the media and the nozzle small.

This consideration, however, results in a limit on the practical height of the characters which can be printed for as the drop flight distance is shortened the amount by which the drops can be deflected is reduced. Attempts at obtaining increased deflection by increasing the voltage on the deflection plates or the charge on the ink drops have not been entirely satisfactory. If, for example, the voltage on the deflection plates is increased, arcing and corona problems occur due to the dielectric breakdown of the air. Similarly, if higher voltages are applied to the charge ring there is a corresponding and significant increase in the voltage rise time which slows down the printing process to unacceptable levels. It must be recognized that there is a maximum amount of charge that can be placed on a drop before its disintegration takes place. This upper limit is defined as:

$$q\ \mathrm{max} = (64 \times 10^{-7} \times \pi^2 K o a^3 T)^{\frac{1}{2}}$$

where "q" is charge in coulombs, "a" is the radius of the drop in centimeters, "T" is the surface tension of the fluid in dynes/cm and "Ko" being the permittivity of free space in farads.

In practice it is important to stay below this maximum charge value. To do this, high surface tension fluids, such as water based inks, would be desirable accompanied by drop diameters as large as possible for the required application sought.

According to the present invention there is disclosed an apparatus and method which permits increased deflection of the charged ink drops without utilizing higher voltages on the deflection plates or the charge ring. This permits printing of larger characters at the normal printing distance between the medium and the nozzle or producing higher quality characters of conventional height by moving the medium closer to the nozzle.

It is accordingly an object of the present invention to provide a method and apparatus for improved ink jet printing.

It is a further object of the invention to provide a method and apparatus for ink jet printing capable of producing larger than normal characters on a print medium without increasing the normal spacing between the nozzle and media or increasing the voltage on the deflection plates or the charge ring.

A further object of the present invention is to provide an apparatus and method for ink jet printing in which the ink drops receive a greater charge without increasing the charge ring rise time.

Another object of the invention is to provide a method and apparatus for ink jet printing which can print standard size characters in front of the merge zone.

It is a further object of the invention to produce an equal but opposite potential on the ink drop stream at the same time a potential is placed on the charge ring thereby increasing the charge on the drops without increasing the voltage rise time for the charge ring.

Other objects and advantages of the invention will be apparent from the remaining portion of the specification.

DETAILED DESCRIPTION

Figure 1:
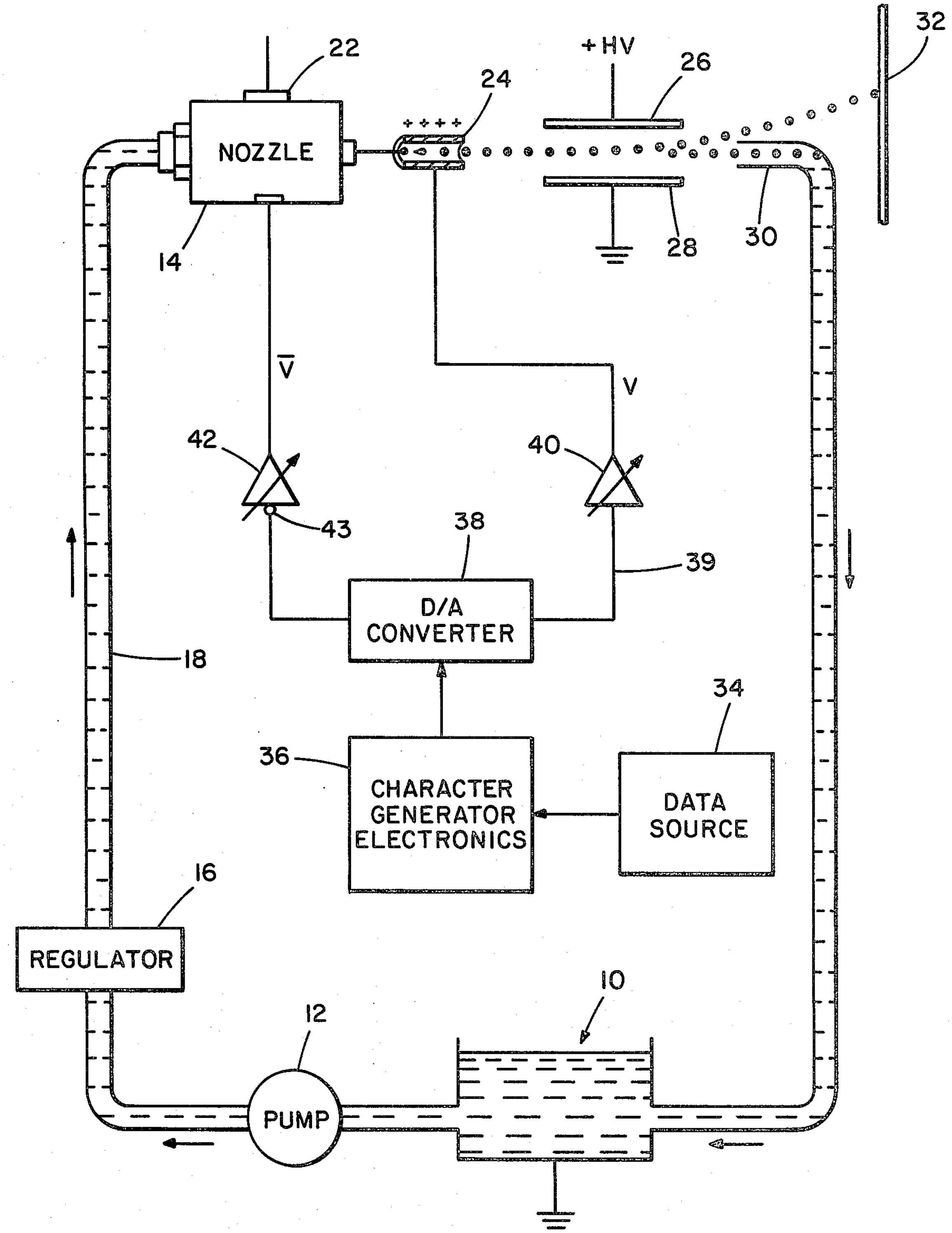
FIG. 1 is a schematic drawing of an apparatus employing the invention.

Referring to FIG. 1, a schematic of an ink jet printing system according to the invention is illustrated. The system utilizes electrically conductive ink, a supply of which is maintained in a tank 10. The tank is electrically grounded. The ink is withdrawn from the tank by a pump 12 and supplied to a nozzle 14 via a regulator 16 in a conventional manner. The resistivity of the ink in the conduit 18 is preferably in the range of 100 ohm-cm to 1500 ohm-cm.

Figure 2:
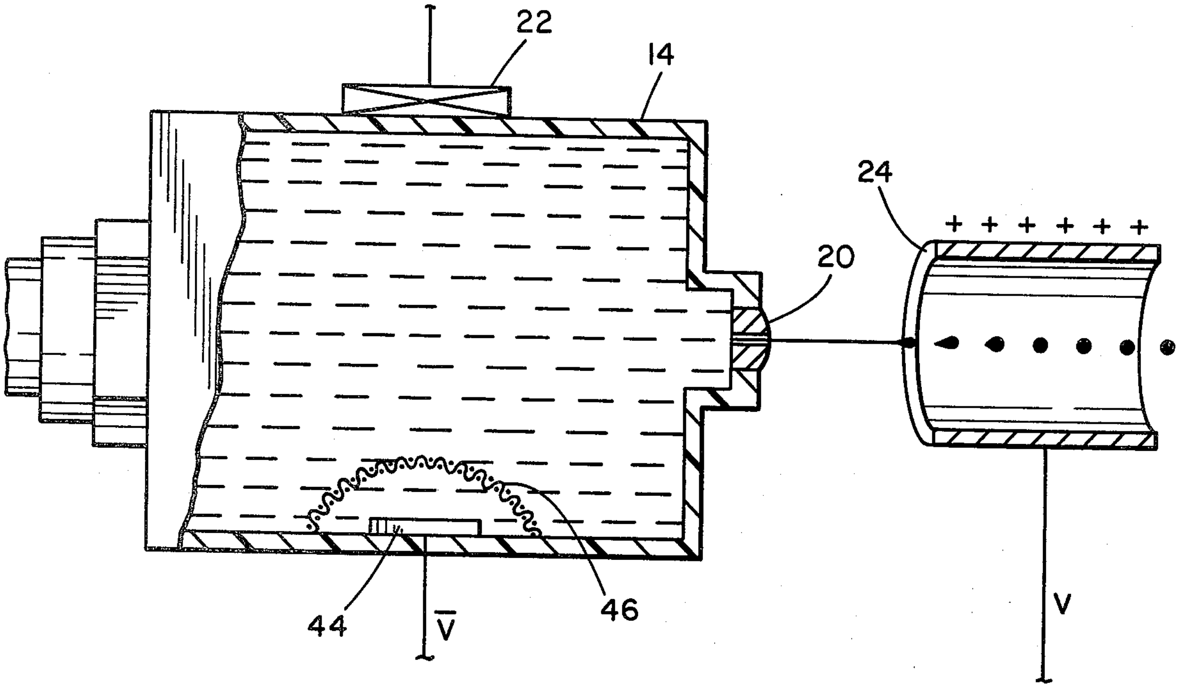
FIG. 2 is an enlarged sectional view of the nozzle and charge ring employed according to the invention.

The ink is forced out of the nozzle 14 through a small opening at the forward end thereof through a jewel 20 (FIG. 2) usually formed of aluminum oxide. The ink is forced from the nozzle by virtue of the pressure from pump 12. The effect of piezoelectric crystal 22 being in contact with the nozzle is to form the ink stream into drops. The frequency of the piezoelectric crystal is usually in the ultrasonic range. See, for example, the discussion provided in my U.S. Pat. No. 3,972,474 incorporated herein by reference. The mechanical vibration and pressure force the ink out of the opening in the jewel 20 forming an ink stream or jet. The jet breaks up into uniform drops due to surface tension and the vibratory effect of the crystal.

The drops are electrically charged by a charge electrode such as the charge ring 24. The charge is acquired as the drops break off from the stream in the proximity of the charge ring thus trapping a selectable charge on each drop. When the charge on the ring is synchronized with the drop formation rate in frequency and phase, it is possible to discretely control the magnitude of the charge acquired by each drop passing through the ring. The drops proceed past the ring 24 to the high voltage deflection plates 26 and 28, the former being connected to a source of high voltage on the order of 5 KV, the latter being grounded. Ink drops which have received no charge from the ring 24 are collected by a gutter 30 and returned to the ink tank 10. Drops which have received a charge are deflected by the electric field of plates 26–28 in an amount proportional to their charge. The deflection causes them to bypass the gutter 30 and strike the printing medium 32 at a location determined by the magnitude of their charge.

As indicated in the background portion of the specification, the amount of drop deflection is a function of (1) the magnitude of the charge on the drops and (2) the distance between the nozzle and the printing medium. One limitation on the amount of charge which can be placed on the ink drops is the rise time required to charge the charge ring 24. Similarly, there is a limitation upon the distance which the medium can be spaced from the nozzle while still maintaining a high quality character generation. If the distance between the two is beyond the merge zone the aforementioned problems of misregistration and merging occur.

According to the present invention greater deflection is obtained by placing an equal but opposite potential on the ink stream behind the nozzle at the same time that a potential is applied to the charge ring 24. This is accomplished, according to a preferred embodiment of the invention, in the manner indicated in FIG. 1.

Figure 3:
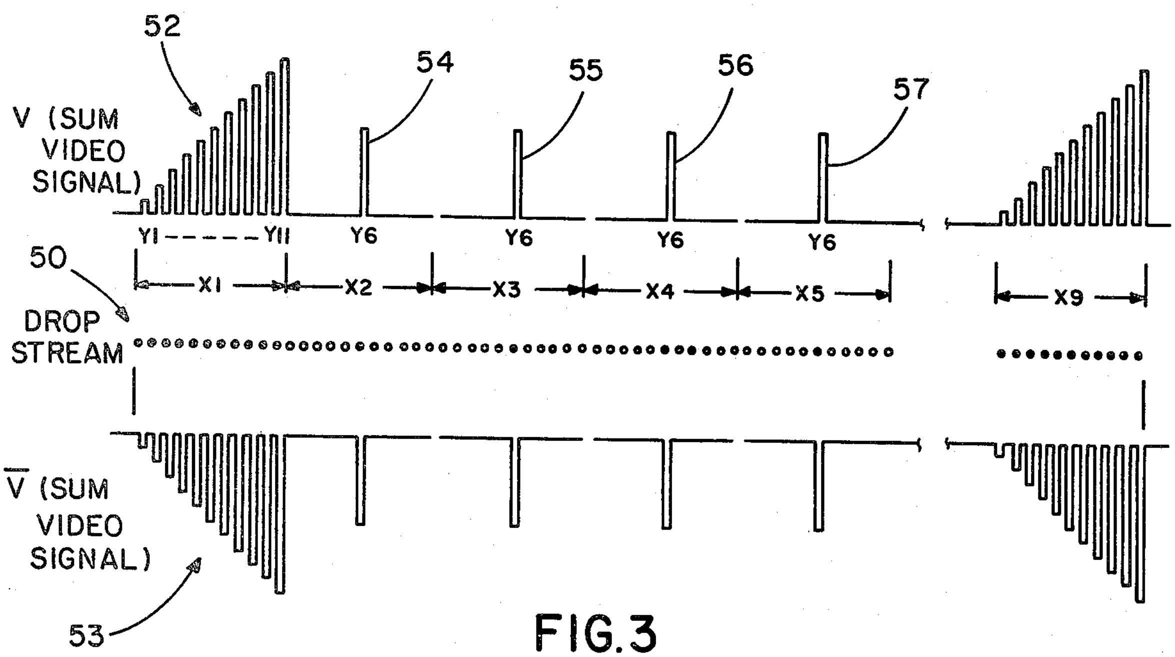
FIG. 3 is a waveform diagram of video signals useful in understanding the invention.

The data source is shown in block form at 34 and is representative of an input from a computer, a keyboard or other input. The characters to be generated are decoded by character generator electronics 36 in the usual manner known to those skilled in the art. The output of the character generator 36 is a binary code which is applied to a digital to analog converter 38. The output of the converter produces a signal on line 39 which is amplified by an operational amplifier 40 having a variable gain appropriately set for the system being utilized. The output of the amplifier 40 is commonly referred to by those skilled in the art as the "video signal" and is represented in the drawings by the symbol V. A typical video output signal is shown in FIG. 3, waveform 52 and will be discussed subsequently. The video signal is utilized to control the voltage on the charge ring 24 discretely charging the ink drops passing therethrough.

According to the invention a second output from the converter 38 is provided receiving the same signal therefrom. This signal passes through a second variable gain amplifier 42 via an inverting input 43 whereby the output from the amplifier 42 is the inverted video signal. As shown in FIG. 3, waveform 54, the inverted signal is equal but opposite in magnitude and is in phase with the noninverted signal. The inverted signal is applied directly to the electrically conductive ink at a selected location behind the jewel 20 of the nozzle 14 by means, in a preferred embodiment, of an electrode 44 (FIG. 2) located inside the nozzle adjacent a wall thereof. It is important that the electrically conductive ink contain no solids or impurities. In order to insure that such impurities are not introduced by galvanic action on the electrode 44 a screen 46 of inert material is provided surrounding the electrode.

In actuality it is not necessary that the inverted video signal be applied to the ink inside the nozzle 14. Indeed, it is sufficient if the signal is applied to the ink supply at any point between the regulator 16 and the nozzle. It is preferred, however, to apply the signal as close as possible to the nozzle to prevent excessive attenuation of the inverted signal which would reduce the effectiveness of the charging characteristics to be described. It is noted that the tank 10 is grounded but if the inverted video signal is applied sufficiently near the nozzle, signal attenuation will not be significant because of the resistivity of the ink.

According to the present invention it is preferred that the nozzle 14 be nonconductive and, for example, it may be formed from plastic of the type sold by Dupont under the trademark DELRIN.

Referring now to FIG. 3, typical video waveforms are illustrated as might be utilized to produce characters on a printing medium. The drop stream 50 is shown in between the video waveform 52 and the inverted waveform 54. The waveform illustrated is for an ink jet printing system which utilizes every other ink drop for printing. Of course, the present invention is suitable for use with systems which use every drop, every other drop or other modes of operation. The illustrated video waveform 52 has a first group "Xl" and last group "Xn" which will cause each succeeding drop in the group to be charged to a higher potential whereby a vertical bar will be printed on the medium 32. Assuming that the medium moves horizontally relative to the nozzle the vertical bars of the first and last group will be spaced from each other and connected by a horizontal bar formed by the single dots represented by video signals 54 through 57. This will form an H and in a similar manner, well known to those skilled in the art, other alpha numeric characters are formed.

As can be seen by inspection of the inverted waveform 54, according to the invention an equal but opposite video signal is applied to the ink behind the jewel. In the prior art this was not the case as the nozzle is usually grounded as is disclosed, for example, in "Ink Jet Printing", Scientific American, April 1979, pages 162 through 178. Considering the effect of applying an inverted video signal to the ink jet it will be perceived that as the jet breaks up into individual drops the negative charge trapped on each drop will be approximately proportional to twice the value of the video signal relative to the charge ring 24. Thus, the ink drops are charged to significantly higher values, nearly double the values which can be obtained in the prior art with no increase in rise time to charge the charge ring 24. Therefore, there is no decrease in the printing speed of the system.

Having effectively increased the negative charge on the ink drops the effect of the high voltage deflection plates 26–28 on the drops is also significantly increased. For a typical prior art system deflection sensitivity is on the order of 0.06 in/100 volts. By virtue of the present invention it is possible to increase this deflection sensitivity on the order of 80 to 100 percent. Thus, as the more highly charged drops enter the plates 26–28 they are deflected away from the gutter by a greater amount for the same plate voltage and thus larger characters can be produced on the medium 32 if it is located at the usual distance from the nozzle. If, however, it is not necessary to produce larger characters, the present invention still provides a significant improvement over the prior art in that it permits the printing medium to be moved closer to the nozzle. This results in a shorter flight path for the ink drops reducing the types and severity of misplacement problems which characterize ink jet printing systems. Particularly significant in this respect is the ability to position the medium in front of the merge zone for standard size printing.

While I have shown and described embodiments of this invention in some detail, it will be understood that this description and illustrations are offered merely by way of example, and that the invention is to be limited in scope only by the appended claims.

I claim:

1. In an ink jet printing system utilizing electrically conductive ink a method of highly charging ink drops which are formed by forcing said ink through a nozzle whereby the drops may be deflected onto a printing medium as a function of their charge, said method comprising the steps of:

(a) producing a first voltage of a first polarity having a time varying magnitude,
(b) applying said first voltage to a charge electrode placed in operative proximity to the flight path of said ink drops,
(c) producing a second voltage of the opposite polarity from said first polarity and having a time varying magnitude substantially equal to said first voltage,
(d) applying said second voltage to the electrically conductive ink prior to the formation of said drops, whereby as the ink drops are formed a charge is trapped on each drop, said charge having said opposite polarity and exceeding the magnitude of said first voltage by a substantial amount.

2. In an ink jet printing system including a nozzle, a charge electrode, high voltage deflection plates and an ink delivery system and wherein ink drops are formed by forcing said ink through said nozzle, the improvement comprising:

(a) means for producing a first voltage of a first polarity having a time varying magnitude,
(b) means for applying said first voltage to said charge electrode placed in operative proximity to the flight path of said ink drops,
(c) means for producing a second voltage of the opposite polarity from said first polarity and having a time varying magnitude substantially equal to said first voltage,
(d) means for applying said second voltage to the electrically conductive ink prior to the formation of said drops, whereby as the ink drops are formed a charge is trapped on each drop, said charge having said opposite polarity and exceeding the magnitude of said first voltage by a substantial amount permitting increased deflection of said drops by said deflection plates.

3. The system according to claim 2 wherein said means for producing a first voltage includes an amplifier having a selectable gain.

4. The system according to claim 2 wherein the means for producing a second voltage includes an amplifier having a selectable gain.

5. The system according to claim 4 wherein said second voltage is produced by inverting said first voltage and wherein said means for producing said second voltage includes means for inverting said first voltage.

6. The system according to claim 2 wherein said means for applying said second voltage includes an electrode in electrical contact with said ink, said second voltage being applied to said electrode thereby to maintain said ink at said second voltage prior to the formation of said ink drops.

7. The system according to claim 6 wherein said electrode is located in the nozzle.

8. The system according to claim 6 wherein said electrode is surrounded by a screen of inert material to prevent the introduction of impurities associated with the electrode into the ink supply.

9. An ink jet printing system capable of producing alpha-numeric characters on a printing medium comprising:

(a) a nozzle having a small opening therethrough for forming an ink jet,
(b) means for supplying electrically conductive ink to said nozzle,
(c) means for causing said ink to pass through said nozzle as a jet and subsequently break up into discrete drops,
(d) a charge electrode placed in operative proximity to the flight path of said drops to induce an electric charge thereon as the drops break away from the ink jet,
(e) means for producing and applying a first time varying voltage of a first polarity to said charge electrode to discretely control the magnitude of the charge induced on each drop,
(f) means for producing and applying a second time varying voltage of the opposite polarity and of substantially equal magnitude to that of said first voltage to said ink jet,
(g) high voltage deflection plates in operative proximity to the flight path of said drops to deflect electrically charged drops onto the printing medium, whereby the magnitude of the charge induced on the ink drops is substantially greater than the magnitude of said first voltage resulting in greater deflection sensitivity of said drops as they pass said deflection plates.

10. The system according to claim 9 wherein said means for producing and applying said second voltage includes an electrode in electrical contact with said ink, said second voltage being applied to said electrode thereby to maintain said ink at said second voltage prior to the formation of said ink drops.

11. The system according to claim 10 wherein said electrode is located in the nozzle.

12. The system according to claim 10 wherein said electrode is surrounded by a screen of inert material to prevent the introduction of impurities associated with the electrode into the ink supply.

* * * * *